(12) United States Patent
Sumi

(10) Patent No.: US 6,309,730 B1
(45) Date of Patent: Oct. 30, 2001

(54) RELEASING FILM

(75) Inventor: Hiroyuki Sumi, Sagamihara (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/581,579

(22) PCT Filed: Oct. 14, 1999

(86) PCT No.: PCT/JP99/05675

§ 371 Date: Jun. 15, 2000

§ 102(e) Date: Jun. 15, 2000

(87) PCT Pub. No.: WO00/21752

PCT Pub. Date: Apr. 20, 2000

(30) Foreign Application Priority Data

Oct. 15, 1998 (JP) .................................................. 10-293489
Jun. 8, 1999 (JP) .................................................. 11-160774

(51) Int. Cl.⁷ ........................... B32B 27/08; B32B 27/28; B32B 27/30; B32B 27/36; B32B 27/42
(52) U.S. Cl. ......................... 428/141; 428/337; 428/339; 428/421; 428/447; 428/480; 428/483; 525/100; 525/101; 525/443; 525/446; 525/447; 525/474; 525/479
(58) Field of Search ..................... 428/141, 332, 428/337, 339, 421, 446, 447, 480, 483; 525/100, 101, 437, 443, 446, 447, 474, 479

(56) References Cited

FOREIGN PATENT DOCUMENTS

| | | |
|---|---|---|
| 02-112411 A | * 4/1990 | (JP) . |
| 07-209802 A | * 8/1995 | (JP) . |
| 10-138431 | 5/1998 | (JP) . |
| 98/14328 | 4/1998 | (WO) . |
| WO98/14328 | 4/1998 | (WO) . |

* cited by examiner

Primary Examiner—Vivian Chen
(74) Attorney, Agent, or Firm—Sughrue, Mion, Zinn, Macpeak & Seas, PLLC

(57) ABSTRACT

A releasing film comprising:
  a base film produced from a polyethylene naphthalate, and
  a releasing layer formed on one or both sides of the base film, wherein the polyethylene naphthalate contains naphthalenedicarboxylic acid as the main acid component and ethylene glycol as the main glycol component and further contains a manganese compound, a phosphorus compound and an antimony compound in Mn, P and Sb amounts satisfying all of the following formulas (1) to (3):

$$0.7 \leq Mn \leq 1.6 \qquad (1)$$

$$0.5 \leq Mn/P \leq 1.2 \qquad (2)$$

$$0.7 \leq Sb \leq 2.2 \qquad (3)$$

(wherein Mn is moles of manganese element per $10^6$ g of acid component; P is moles of phosphorus element per $10^6$ g of acid component; and Sb is moles of antimony element per $10^6$ g of acid component), and the base film has a surface center line average roughness (Ra) of 2 to 50 nm.

19 Claims, No Drawings

RELEASING FILM

DETAILED DESCRIPTION OF THE INVENTION

1. Technical Field Pertinent to the Invention

The present invention relates to a releasing film. More particularly, the present invention relates to a releasing film superior in thermal stability, surface smoothness and surface flatness, which is useful as a carrier film used in production of a resin sheet, a resin coating or the like from a resin solution, or as a carrier film used in production of a ceramic sheet or the like from a ceramic slurry, or as a protective film for adhesive layer such as adhesive tape or the like. The present invention further relates to a releasing film which allows uniform coating of even aqueous adhesive coating fluid, aqueous resin solution or aqueous slurry and which can be smoothly transferred in production of adhesive coating, resin coating or sheet, or the like.

2. Prior Art

Releasing films are in use as a carrier film in producing a resin sheet, a resin coating, a ceramic sheet or the like.

That is, a resin sheet is produced, for example, by coating (casting), on a carrier film, a solution of a resin obtained by polyvinyl chloride or the like, removing the solvent contained in the solution, by heating, and peeling and removing the carrier film; and is used in applications such as marking sheet and the like.

A resin coating is produced, for example, by dissolving a resin such as an adhesive in a solvent, coating the solution on a carrier film, and removing the solvent by heating.

A ceramic sheet is produced, for example, by dispersing a ceramic powder, a binder, etc. in a solvent, coating the resulting slurry on a carrier film, removing the solvent by heating, and peeling and removing the carrier film.

In recent years, production of such a resin sheet, a resin coating, a ceramic sheet as aforementioned using a releasing film has become frequent. When a ceramic sheet or a resin sheet is used in applications requiring high performances, such as electronic parts, optical parts and the like, the sheet must have a uniform thickness and high surface properties, all of which are superior to conventional levels. A ceramic sheet, when used in production of a ceramic electronic part exemplified as a condenser, is often laminated; for obtaining a condenser of higher electrostatic capacity, the ceramic sheet is becoming thinner and coming to be used in multilayer lamination.

As IC packages or circuit substrates have become more complex, ceramic substrates are moving toward higher functions brought about by multilayer, higher performances, and smaller size and lighter weight, as in laminated condensers. In forming a multilayer circuit, throughholes are formed for layer-to-layer connection by wiring; therefore, accurate production of ceramic sheet and accurate positioning of throughholes are necessary. This is true also for resin substrates.

Hence, such a resin sheet, a ceramic sheet or the like must have a uniform thickness, high accuracy and a smooth surface. In order to produce such a sheet, the facility used for coating a coating fluid such as resin solution, adhesive, ceramic slurry or the like is required to be of high accuracy type, and the carrier film used for production of the above sheet is also required to have surface smoothness of resin sheet after peeling, flatness free from sagging or curling habit, dimensional stability after heat treatment, and good processability in punching, cutting, etc.

As the base film for the carrier film, there are used various films, for example, an olefin-based film (e.g. OPP) and a biaxially oriented polyethylene terephthalate (hereinafter abbreviated to PET in some cases) film. For example, a PET film has, in most cases, a roughened surface by adding a filler or the like for improved windability. Therefore, when a PET film containing a filler and resultantly having a rough surface is used as a carrier film for production of a resin sheet, a ceramic sheet or the like, pin holes may generate when a resin solution or the like has been coated on the carrier film, making it impossible to produce a uniform thin sheet and giving a faulty product, in some cases. When such a sheet is laminated, voids appear easily at the interface of two adjacent layers, in some cases.

When the filler or the like is restricted strictly in the size or the addition amount, the base film comes to have too small a surface roughness. As a result, in the wind-up roll for the film, the film-to-film contact area becomes large, abnormal peeling, etc. arise owing to the blocking, and film slipperiness becomes low; further, in the step of producing a resin sheet or the like, the base film has a problem in transferability, in some cases.

A releasing film, after a resin solution or a ceramic slurry has been coated thereon, is heated for removal of the solvent contained in the solution or the slurry. The heating temperature is, in many cases, close to or higher than the glass transition temperature (Tg) of the base film used in the releasing film. As a result, the releasing film causes dimensional change and thermal deformation such as wrinkles and the produced resin sheet or the like has thickness non-uniformity and poor surface smoothness and is deteriorated in quality. It is feared that with a shortened heating time and an increased heating temperature for improved productivity of the resin sheet or the like, the above quality deterioration appears as a bigger problem. Therefore, a base film of high heat resistance is desired.

A releasing film, before a resin solution or a ceramic slurry is coated thereon, is often wound in a roll form; when the roll is unwound for coating the solution or slurry thereon, the unwound releasing film shows sagging or curling at times. Thereby, the resin sheet coated on the unwound releasing film may have inferior surface flatness. Further, the prepared base film has residual internal stress, depending upon the production conditions thereof; when a resin solution or the like is coated on the releasing film, the residual internal stress is rapidly relaxed, sagging appears locally, and the resin sheet coated has inferior surface flatness.

A releasing film generally has thereon a layer of a silicone resin, a fluororesin or an aliphatic wax in order to allow the film to have releasability. A silicone resin is particularly preferred because it can be easily peeled when released, can be applied on the releasing film in a small layer thickness, and is inexpensive. The silicone resin has a small surface energy (the surface tension ($\gamma S$) of the silicone resin is about 19 to 21 dyne/cm) and, therefore, almost uniform coating is possible when there is applied, on the silicone resin, an adhesive coating fluid or a resin solution which are dispersed or dissolved in an organic solvent; however, when there is applied, on the silicon resin, an aqueous adhesive coating fluid or an aqueous resin solution, the applied fluid or solution may be scattered in drops (a state of cissing), because water has a large surface tension ($\gamma L$) which is about 73 dyne/cm. In order to alleviate this problem, there are taken a method of using a coating fluid (a resin solution or a slurry) of higher viscosity and a method of adding a surfactant or the like to a coating fluid to reduce the surface tension of the coating fluid. However, the method of using a coating fluid of higher viscosity has a problem in that the leveling in application of the coating fluid is difficult, the thickness of the film formed tends to be nonuniform, and it is difficult to obtain a resin sheet, a resin coating or the like in a thin layer. In case of adding a surfactant invites problems, for example, depending upon the kind and amount of the surfactant added, the sheet obtained has a low strength and it is impossible to obtain a sheet of stable quality.

A resin sheet, a resin coating, a ceramic sheet, etc., which are obtained using a releasing film, are required to have a smaller thickness and a uniform and flat surface. The presence, on the surface of the releasing film, of foreign matter and/or large projections is not preferred because it gives a resin sheet having defects such as pin holes and the like. Therefore, the releasing film is required to have a surface condition of high degree.

In applying, onto a releasing film, a coating fluid such as resin solution or the like, a given tension is generally applied to the releasing film in its transfer direction to make uniform the surface of the releasing film; then, the coating fluid is applied, followed by a drying step, etc. The method for controlling the tension applied includes a method of controlling the tension by a balance between the speed of unwind roll and the speed of wind-up roll, and a method of, after unwinding, controlling the tension by suction via a vacuum roll. In order to obtain a uniform and flat surface during application of coating fluid and drying, a method is particularly useful which comprises nipping the releasing film between a metal roll and a rubber roll and controlling the tension applied to the film being driven. At that time, ordinarily, the rubber roll is allowed to contact with the releasing layer side of the releasing film and the metal roll (to which mirror-surface plating of chromium is applied in many cases) is allowed to contact with the other side of the releasing film. If there is a difference in slipperiness between the rubber roll-releasing layer side interface and the metal roll-other side interface, the rotation of rolls and the follow-up action of releasing film relative to driving become insufficient; as a result, the releasing film comes to have surface flaws (e.g. scratch) or surface chipping, a coating fluid is applied with the chip being present on the surface of the releasing film, and the adhesive coating, ceramic sheet or the like obtained has defects.

Problem to be Solved by the Invention

The first object of the present invention is to provide a releasing film used for production of a resin sheet, a resin coating, a ceramic sheet or the like, which releasing film has a uniform and flat surface and shows small thermal deformation when heat-treated.

The second object of the present invention is to provide a releasing film used for production of a resin sheet, a resin coating, a ceramic sheet or the like, which releasing film is superior in processability after production of said sheet or film, such as cuttability, punchability or the like.

The other object of the present invention is to provide a releasing film which has a surface of releasing layer giving no cissing (having good wettability) even when an aqueous coating fluid has been coated thereon, which enables release (has good releasability) of an adhesive coating, a resin sheet, a ceramic sheet or the like, all produced thereon, at a proper force, which enables production of said film or sheet in a small thickness and a flat surface, and which is superior in transferability in production of said film or sheet.

Means for Solving the Problem

According to the study by the present inventor, the above objects of the present invention can be achieved by a releasing film comprising:

a base film produced from a polyethylene naphthalate, and a releasing layer formed on one or both sides of the base film, wherein the polyethylene naphthalate contains naphthalenedicarboxylic acid as the main acid component and ethylene glycol as the main glycol component and further contains a manganese compound, a phosphorus compound and an antimony compound in Mn, P and Sb amounts satisfying all of the following formulas (1) to (3):

$$0.7 \leq Mn \leq 1.6 \quad (1)$$

$$0.5 \leq Mn/P \leq 1.2 \quad (2)$$

$$0.7 \leq Sb \leq 2.2 \quad (3)$$

(wherein Mn is moles of manganese element per $10^6$ g of acid component; P is moles of phosphorus element per $10^6$ g of acid component; and Sb is moles of antimony element per $10^6$ g of acid component), and the base film has a surface center line average roughness (Ra) of 2 to 50 nm.

The releasing film of the present invention is described below in more detail.

The base film used in the releasing film of the present invention is a film produced from a polyethylene naphthalate, of which constituting polymer is a polyethylene naphthalate obtained by subjecting, to polycondensation, naphthalenedicarboxylic acid as a main acid component and ethylene glycol as a main glycol component, and is hereinafter abbreviated to "PEN" in some cases.

As the naphthalenedicarboxylic acid, there can be mentioned, for example, 2,6-naphthalenedicarboxylic acid, 2,7-naphthalenedicarboxylic acid and 1,5-naphthalenedicarboxylic acid. Of these, 2,6-naphthalenedicarboxylic acid is preferred.

Use of a main acid component other than naphthalenedicarboxylic acid is not preferred because, when the polymer obtained therefrom is molded into, for example, a film, wound up round a roll, and unwound from the roll, the film has residual curling habit and no satisfactory surface smoothness.

In the PEN polymer, other carboxylic acid components can be used as a comonomer in an amount of 20 mole % or less relative to the amount of total acid components, as long as the heat distortion resistance of releasing film is not impaired. Examples of the other carboxylic acid components are other aromatic dicarboxylic acids (e.g. terephthalic acid, isophthalic acid, diphenylethanedicarboxylic acid, diphenyldicarboxylic acid, diphenyl ether dicarboxylic acid, diphenylsulfonedicarboxylic acid, diphenylketonedicarboxylic acid and anthracenedicarboxylic acid), aliphatic dicarboxylic acids (e.g. adipic acid, succinic acid, sebacic acid and dodecanedicarboxylic acid), alicyclic dicarboxylic acids (e.g. cyclohexane-1,4-dicarboxylic acid and 1,3-adamantanedicarboxylic acid), and aliphatic oxyacids (e.g. hydroxybenzoic acid and ω-hydroxycaproic acid).

As glycol components other than ethylene glycol, constituting the PEN film, there can be mentioned, for example, aliphatic glycols (e.g. $C_{3-10}$ polymethylene glycols such as trimethylene glycol, tetramethylene glycol, pentamethylene glycol, hexamethylene glycol, decamethylene glycol and the like; and cyclohexanedimethanol), aromatic diols (e.g. hydroquinone, resorcin and 2,2-bis(4-hydroxyphenyl) propane), and poly(oxy)alkylene glycols (e.g. polyethylene glycol and polytetramethylene glycol). The amount of these other glycol components is preferably 20 mole % or less relative to the amount of total glycol components.

Also in the PEN polymer, glycol components other than ethylene glycol, for example, compounds of three or higher functionalities such as glycerine, pentaerythritol, trimellitic acid, pyromellitic acid and the like may be used as a comonomer in a very small amount as long as a substantially linear polymer is obtained, the heat distortion resistance of releasing film is not impaired, and the effects of the present invention are not impaired.

Further, in the PEN polymer, part or all of the terminal hydroxyl groups and/or carboxyl groups may be blocked with a monofunctional compound such as benzoic acid, methoxypolyalkylene glycol or the like, in order to improve the hydrolysis resistance of PEN polymer.

Most preferably, the PEN polymer of the present invention contains ethylene-2,6-naphthalate units in an amount of at least 80 mole %, preferably at least 90 mole % relative to the total repeating units. Desirably, the PEN polymer contains diethylene glycol units in a small proportion.

In the PEN polymer, the content of the diethylene glycol units is preferably 0.4 to 3% by weight, particularly preferably 0.8 to 2% by weight. When the content of the diethylene glycol units is less than 0.4% by weight, the crystallization of polymer is not suppressed and a large energy is required for melting. Therefore, unmolten polymer remains in produced film and the film surface may have large protrusions. Meanwhile, when the content of the diethylene glycol units is more than 3% by weight, the film produced from the PEN polymer is low in strength, for example, Young' modulus and inferior in durability, which is not preferred.

The PEN polymer of the present invention can be produced by a per se known process for polyester production. However, it is preferred to produce by ester interchange, that is, by reacting a lower alkyl ester of naphthalenedicarboxylic acid with ethylene glycol. As the lower alkyl ester of naphthalenedicarboxylic acid, there can be mentioned, for example, a dimethyl ester, a diethyl ester and a dipropyl ester. A dimethyl ester is particularly preferred.

The PEN polymer used in the present invention has an inherent viscosity as measured at 35° C. in an o-chlorophenol solution, of preferably 0.40 to 0.90 dl/g, particularly preferably 0.50 to 0.85 dl/g. When the inherent viscosity is in the above range, a polyester film superior in heat resistance is obtained easily and the extrudability and film formability of molten PEN polymer are good.

To the PEN polymer of the present invention can be added inorganic or organic fine particles having an average particle diameter of 0.01 to 20 $\mu$m, preferably 0.1 to 5 $\mu$m as long as the effects of the PEN polymer are not adversely affected, in order to allow the film produced therefrom, to have slipperiness and good windability.

Such fine particles are added preferably in an amount of, for example, 0.001 to 10% by weight so that the base film can have a surface center line average roughness (Ra) of 2 to 50 nm, preferably 6 to 30 nm. A particularly preferably amount of the fine particles is 0.01 to 3% by weight.

As preferred specific examples of the fine particles, there can be mentioned inorganic fine particles of silicon dioxide, anhydrous silicon, hydrated silicon, aluminum oxide, kaolin, calcium carbonate, titanium oxide, aluminum silicate (including calcined product, hydrate, etc.), lithium benzoate, barium sulfate, double salts of these compounds (including hydrates), carbon black, glass powder, clay (including kaolin, bentonite, terra abla, etc.), and so forth; and organic fine particles of crosslinked acrylic resin, crosslinked polystyrene resin, melamine resin, crosslinked silicone resin, polyamideimide resin, etc.

The fine particles are preferred to be inactive particles so that neither interaction nor resultant property change takes place and the effects of the present invention can be maintained. The fine particles may consist of one kind or two or more kinds. The PEN polymer, as compared with PET polymer, has a rigid molecular chain and, when made into a film, has high stiffness. Therefore, the PEN polymer gives good slipperiness and shows sufficient windability even when the fine particles are added in a smaller amount than in PET polymer.

To add the fine particles to the PEN polymer, there may also be used a method of forming, on at least one side of the base film, a thin layer containing the fine particles. The layer formation can be made, for example, by forming such a layer at the time of film formation, or by co-extrusion using, for example, a plurality of extruders or a feed block and a multi-manifold die. To the PEN polymer can be added, besides the fine particles, additives such as stabilizer, ultraviolet absorber, coloring agent, flame retardant, antistatic agent, light stabilizer, antioxidant and the like, as long as the surface flatness and thermal stability of film are not impaired. Also, other thermoplastic resin may be added in a small amount (for example, 20% by weight or less, particularly 10% by weight or less).

In producing the PEN polymer in the present invention, a manganese compound, preferably a manganese compound soluble in the reaction system is added as an ester interchange catalyst, to naphthalenedicarboxylic acid, preferably a lower alkyl ester thereof and ethylene glycol, to conduct ester interchange.

The manganese compound is added in an amount of 0.7 to 1.6 moles in terms of manganese element (Mn) amount per $10^6$ g of total acid components (the unit of the amount added is hereinafter is referred to as mole(s) element/ton). The amount added is preferably 1.0 to 1.5 moles element/ton.

When the amount of manganese compound added is more than 1.6 moles element/ton, the residual catalyst comes out as particles and, when a film is produced, the film is inferior in surface flatness; as a result, the film has poor transparency in some cases. Further, when a releasing layer is formed on the film and, in particular, an addition reaction type silicone resin or the like is coated on the film, the above-mentioned particles become a catalyst poison to the curing of the silicone, which invites insufficient curing of the silicone in some cases. Meanwhile, when the addition amount is less than 0.7 mole element/ton, ester interchange takes place insufficiently and successive polymerization is slow, which is not preferred.

There is no particular restriction as to the kind of the manganese compound used in the present invention. However, the compound is preferably an oxide, a chloride, a carbonate, a carboxylate or the like, particularly preferably an acetate, i.e. manganese acetate.

In producing the PEN polymer in the present invention, a phosphorus compound is added when the ester interchange is substantially complete, in order to deactivate part of the ester interchange catalyst used.

The molar ratio (Mn/P) of the ester interchange catalyst, i.e. the manganese compound to the phosphorus compound is required to be 0.5 to 1.2, preferably 0.6 to 1.1. When the molar ratio is less than 0.5, the residual catalyst comes out as particles and, when a film is produced, the film is inferior in surface flatness. Further, when a releasing layer is formed on the film and, in particular, an addition reaction type silicone resin or the like is coated on the film, the above-mentioned particles become a catalyst poison to the curing of the silicone, which may invite insufficient curing of the silicone. Meanwhile, a molar ratio more than 1.2 is not preferred because the activity of the manganese compound not sufficiently deactivated by the phosphorus compound deteriorates the thermal stability of PEN polymer, deteriorating the color and surface flatness of the film produced.

As the phosphorus compound used in the present invention, there can be mentioned trimethyl phosphate, triethyl phosphate, tri-n-butyl phosphate, phosphoric acid, etc. Trimethyl phosphate is preferred particularly.

In producing the PEN polymer in the present invention, the phosphorus compound is added and then the reaction product is subjected to polycondensation to obtain a PEN polymer.

At that time, to the reaction product is added an antimony compound as a main catalyst for polycondensation. The antimony compound may be added before the start of the ester interchange.

The amount of the antimony compound added is required to be 0.7 to 2.2 moles element/ton, preferably 0.7 to 2.0 moles element/ton. An addition amount of less than 0.7 mole element/ton is not preferred because the polycondensation does not proceed sufficiently, resulting in low productivity. Meanwhile, an addition amount of more than 2.2 moles element/ton is not preferred because, when film formation is conducted for a long time, an antimony compound-based precipitate appears and becomes a flaw of the film produced and further because, when a releasing layer is formed on the film and, in particular, an addition reaction type silicone resin or the like is coated on the film, the above-mentioned precipitate becomes a catalyst poison to the curing of the silicone, making insufficient the curing of the silicone.

The antimony compound used in the present invention is preferably an oxide, a chloride, a carbonate, a carboxylate or the like. An acetate, i.e. antimony acetate is particularly preferred because this compound, as compared with other compounds, generates a smaller amount of particles in the produced polymer and gives a film of improved transparency.

There is no particular restriction as to the method for film formation from the PEN polymer, and the film formation from the PEN polymer can be conducted by a per se known method. Examples of the method for film formation from the PEN polymer are mentioned below.

The biaxially oriented PEN film used in the present invention can be produced by a known method such as successive biaxial stretching method, simultaneous biaxial stretching method or the like. In, for example, successive biaxial stretching method, a PEN polymer is sufficiently dried; then, the polymer is melt-extruded at a temperature of Tm to (Tm+70)° C. (Tm is the melting point of the PEN polymer) to produce an unstretched film; successively, the unstretched film is stretched 2 to 6 times in the film-winding direction at a temperature of (Tg−10) to (Tg+50)° C. (Tg is the glass transition temperature of the PEN polymer); the resulting film is stretched 2 to 6 times in a direction perpendicular to the above direction at a temperature of Tg to (Tg+50)° C.; the stretched film is thermoset for 5 seconds to 1 minute at a temperature of (Tg+60) to (Tg +140)° C.; thereby, film formation is completed. The thermosetting may be conducted under tension or under restricted shrinkage. In the melt extrusion, electrostatic adhesion is used preferably. The stretching conditions in the winding direction and the direction perpendicular thereto are preferably selected so that the properties of the biaxially oriented PEN film obtained are approximately equal in the longitudinal direction and the transverse direction.

When the temperature of thermosetting is lower than (Tg+60)° C., the film produced, when stored in a wound state, may come to have curling habit or may cause interlaminar delamination. Meanwhile, when the temperature of thermosetting is higher than (Tg+140)° C., the film produced is excessively crystallized and accordingly causes whitening, and is insufficient in transparency and mechanical strengths.

Also in simultaneous biaxial stretching, there can be used the same stretching temperature, draw ratio and thermosetting temperature, etc. as in the above successive biaxial stretching.

The base film preferably has an elastic modulus of $1.0 \times 10^{11}$ to $1.7 \times 10^{11}$ dyne/cm$^2$ in both the film-winding direction and a direction perpendicular thereto. When the elastic modulus is smaller than $1.0 \times 10^{11}$ dyne/cm$^2$, fin, warpage, etc. tend to appear in punching such as cutting or the like. When the elastic modulus is larger than $1.7 \times 10^{11}$ dyne/cm$^2$, cutting proceeds more than required and no intended cutting is attained.

The base film of the present invention preferably has a density of 1.360 to 1.370 g/cm$^3$. When the film has a density of smaller than 1.360 g/cm$^3$, the molecules oriented by stretching are not crystallized sufficiently, the film is inferior in dimensional stability, and, when treated at 200° C. for 10 minutes in free length, the film shows a thermal shrinkage as absolute value of larger than 1.0% in at least one direction. When the film has a density of larger than 1.370 g/cm$^3$, the film is fragile owing to the crystallization and is inferior in impact resistance.

Further, the base film of the present invention has a surface center line average roughness (Ra) of preferably 2 to 50 nm, particularly preferably 6 to 30 nm. When the surface center line average roughness (Ra) is less than 2 nm, the film has inferior slipperiness and poor windability. When the surface center line average roughness (Ra) is more than 50 nm, the film has too large a surface roughness and, when the film is used as a releasing film, the resin sheet or the like formed thereon by casting has a rough surface and is unable to have a smooth surface.

The base film used in the present invention has no particular restriction as to the thickness. However, the thickness is preferably 5 to 500 μm, particularly preferably 10 to 200 μm.

It is advantageous that the base film used in the present invention has a refractive index of 1.49 to 1.53, preferably 1.495 to 1.520 in the thickness direction. When the refractive index in the thickness direction is smaller than 1.49, the film may cause delamination or may have inferior flexing resistance, which tends to cause fluffing, etc. in processing such as cutting, punching, perforation and the like. When the refractive index in the thickness direction is larger than 1.53, the film has high thickness non-uniformity and tends to generate surface wrinkles.

It is desirable that the base film used in the present invention has a plane orientation coefficient (NS) of 0.23 to 0.27. When the plane orientation coefficient is smaller than 0.23, the film has poor thickness non-uniformity, and the resin or ceramic sheet formed thereon by coating a resin solution, a ceramic slurry or the like may have thickness non-uniformity. When the plane orientation coefficient is larger than 0.27, the film easily causes delamination, the scars generated at the surface or edge by scratching tend to become uneven scars, and the delaminated parts and the scars look whitish and conspicuous.

The base film used in the present invention preferably has a sum of the tearing propagation resistances in longitudinal direction (film-winding direction) and in direction perpendicular thereto, of 4 N/mm or less. A sum of the tearing propagation resistances, of larger than 4 N/mm is not preferred because the punchability of film is low. A sum of the tearing propagation resistances, of 4 N/mm or less can be obtained by setting the production conditions of film, particularly the draw ratio of film at a relatively high level in the above-mentioned range.

The releasing film of the present invention preferably has a dimensional change as absolute value of 0.3% or less in both of the longitudinal direction of base film (film-winding direction) and a direction perpendicular thereto, at 120° C. under a stress of 150 gf/mm². When the dimensional change as absolute value is larger than 0.3%, the releasing film is deformed when a ceramic slurry or a resin solution is coated thereon and the solvent in the slurry or the solution is removed by heating, and a ceramic or resin sheet having a flat surface is not be obtained in some cases.

In the present invention, on at least one side of the base film is formed a releasing layer. As the component constituting the releasing layer, there can be mentioned a silicone resin, a fluororesin and an aliphatic wax. The releasing layer has a thickness of 0.02 to 50 $\mu$m, preferably 0.04 to 10 $\mu$m.

To the component constituting the releasing layer can be added various known additives as long as the objects of the present invention are not hindered. As the additives, there can be mentioned, for example, an ultraviolet absorber, a pigment, an antifoaming agent and an antistatic agent.

Formation of the releasing layer can be conducted by coating, on a base film, a solution containing the components to constitute the releasing layer, followed by heating and drying to form a coating film. The heating conditions are preferably 80 to 160° C. for 10 to 120 seconds, particularly preferably 120 to 150° C. for 20 to 60 seconds. The coating can be conducted by a known method, and preferred are, for example, roll coater coating and blade coater coating.

In the releasing film of the present invention, it is preferred that an adhesive layer is formed between the base film and the releasing layer in order to obtain higher adhesivity. As the component constituting the adhesive layer, a silane coupling agent is preferred when the releasing layer is, for example, a silicone resin layer. The silane coupling agent is preferably one represented by a general formula of Y—Si—$X_3$. Here, Y is a functional group represented by amino group, epoxy group, vinyl group, methacrylic group, mercapto group or the like; and X is a hydrolyzable functional group represented by alkoxy group. The adhesive layer has a thickness of preferably 0.01 to 5 $\mu$m, particularly preferably 0.02 to 2 $\mu$m. When the thickness of the adhesive layer is in the above range, the adhesivity between the base film and the releasing layer is good and the base film on which the adhesive layer has been formed hardly causes blocking; therefore, the releasing film has substantially no handling problem.

A study by the present inventors revealed that when, in a releasing film produced by forming a releasing layer on one or both sides of a base film, there is no large difference between the dynamic friction coefficient of the releasing layer side of the releasing film to a rubber surface and the dynamic friction coefficient of the other side of the releasing film to a metal surface, that is, when the difference of the above two dynamic friction coefficients is in a certain range, the releasing film is superior in slipperiness and processability, productions of various sheets can be smoothly transferred thereon, thereby making possible production of a sheet having a smooth surface.

When the releasing film of the present invention has a releasing layer at both sides, it is advantageous that the dynamic friction coefficient ($\mu$dR) of one releasing layer side of the releasing film to a rubber surface and the dynamic friction coefficient ($\mu$dM) of the other releasing layer side of the releasing film to a metal surface satisfy the following formula (4):

$$-0.5 \leq (\mu dR - \mu dM) \leq 0.5 \qquad (4)$$

When the releasing film of the present invention has a releasing layer at one side, it is advantageous that the dynamic friction coefficient ($\mu$dR) of the releasing layer side of the releasing film to a rubber surface and the dynamic friction coefficient ($\mu$dM) of the other side of the releasing film to a metal surface satisfy the following formula (4):

$$-0.5 \leq (\mu dR - \mu dM) \leq 0.5 \qquad (4)$$

The dynamic friction coefficients to a rubber surface and a metal surface are, as described later, the dynamic friction coefficients of the present releasing film to a rubber surface and a metal surface, each having a particular surface and made of a particular material, and indicate the slipperiness of the releasing film. Specifically, the formula (4) indicates that when the releasing film is transferred while being nipped between a rubber roll and a metal roll, the dynamic friction coefficients of the releasing film at the rubber surface and the metal surface have a small difference between them. That is, the formula (4) indicates that the difference of the two dynamic friction coefficients ($\mu$dR–$\mu$dM) is in a range of –0.5 to +0.5. The difference is more preferably in a range of –0.4 to +0.4.

A study by the present invention revealed that, in order to achieve the above dynamic friction coefficient at the releasing layer surface of the releasing film, it is desirable to use a silicone resin as the component constituting the releasing layer and further to mix, into the silicone resin, a particular proportion of a melamine resin and an alkyd resin and/or an acrylic resin.

That is, it is desirable that the releasing layer of the present releasing film is composed mainly of a resin composition comprising 1 to 50 parts by weight of a silicone resin on the basis of 100 parts by weight of a resin mixture consisting of a melamine resin and an alkyd resin and/or an acrylic resin.

When the resin constituting the releasing layer consists of a silicone resin alone, it is known to use, as the silicone resin, a reactive silicone, for example, an addition reaction type or condensation reaction type silicone in order to reduce the transferability of silicone as low as possible. In the slipperiness (friction coefficient) between releasing layer and rubber, good slipperiness (low friction coefficient) is obtained when such a silicone resin has a small thickness; however, when the thickness exceeds a certain level, the slipperiness tends to become bad (high friction coefficient) suddenly. This is due to the small hardness of the silicone resin per se and, to improve the slipperiness, a resin of high hardness can be used in the releasing layer.

When a resin solution or the like is coated on the releasing layer made of a silicone resin of releasing film, cissing appears at times because the silicone resin has a low surface energy and poor wettability. Therefore, it is particularly preferred that the releasing layer is made of a resin mixture consisting of a silicone resin with a melamine resin and an alkyd resin and/or an acrylic resin, because high wettability and releasability are achieved.

In the resin mixture in the releasing layer of the present invention, at least part of the alkyd resin and the acrylic resin forms a copolymer with the silicone resin when they are blended, and the melamine resin has a crosslinking reaction mainly with the alkyd resin to give a hard releasing layer.

The alkyd resin is obtained by modifying a condensation product between a polybasic acid exemplified by a phthalic anhydride as an acid component and a polyhydric alcohol exemplified by a glycerine or ethylene glycol as a glycol component, with a fatty acid such as drying oil or the like. The fatty acid can be exemplified by castor oil, soybean oil and linseed oil; however, various fatty acids of any combination may also be used.

With respect to the resin mixture in the releasing layer, the silicone resin can be added, for example, during or after production of the alkyd resin, to graft the silicone resin to the alkyd resin, that is, give rise to graft copolymerization.

The acrylic resin is added in order to allow the releasing layer to have higher toughness and good surface wettability. As the acrylic resin, there can be used, for example, a polyacrylic acid, a polymethacrylic acid and a polymethyl methacrylate.

The mixing ratio of the alkyd resin and the acrylic resin can be varied depending upon the intended purpose because a different mixing ratio gives different properties. However, it is preferred to mix at a ratio of 100 parts by weight of the alkyd resin and 50 to 300 parts by weight of the acrylic resin.

As the melamine resin, there can be used, for example, a methylated melamine resin, a butylated melamine resin and a methylated urea melamine resin. The mixing ratio of the melamine resin to the alkyd resin and the acrylic resin is preferably 10 to 200 parts by weight of the melamine resin to 100 parts by weight of the total of the alkyd resin and the acrylic resin. By using this mixing ratio, the releasing film can be allowed to have a small difference as mentioned above, in the dynamic friction coefficients. It is possible to use an acid catalyst exemplified by a sodium p-toluenesulfonate as a catalyst for crosslinking reaction between the melamine resin and the alkyd resin.

The silicone resin in the releasing layer is a polymer having a basic skeleton of polydimethylsiloxane. It preferably has a phenyl group, an alkyl group or the like at the terminal(s) or side chain(s) so as to have improved compatibility with the alkyd resin, etc. As specific examples of such a silicone resin, there can be mentioned a polyphenylpolysiloxane and a hydroxyl-substituted diphenylpolysiloxane. The amount of the silicone resin used is preferably 1 to 50 parts by weight, more preferably 1 to 30 parts, particularly preferably 5 to 10 parts by weight relative to 100 parts by weight of the total of the alkyd resin, the melamine resin and the acrylic resin.

In the present invention, the releasing layer is formed on at least one side of the base film. The releasing layer can be formed, for example, by coating, on the base film, a solution containing the above-mentioned components constituting the releasing layer, followed by heating/drying and curing to form a coating film. The method for coating can be any per se known method. There can be mentioned, for example, roll coating, blade coating and bar coating. The heating/drying conditions are preferably 80 to 160° C. and 10 to 120 seconds, particularly preferably 120 to 150° C. and 20 to 60 seconds. The thickness of releasing layer after drying is preferably 0.02 to 50 μm, particularly preferably 0.04 to 10 μm.

In the releasing film of the present invention, the center line average roughness (Ra) of the releasing layer surface is preferably 6 to 30 nm, more preferably 20 nm or less, particularly preferably 10 nm or less. A center line average roughness (Ra) exceeding 30 nm is not preferred because the surface state of the releasing film is transferred onto a resin sheet or the like, causing pin holes, etc.

Thus, according to the present invention, there are also provided the following releasing films (A) and (B). (A) A releasing film comprising a base film produced from a polyethylene naphthalate and a releasing layer formed on both sides of the base film, wherein the dynamic friction coefficient ($\mu$dR) of one releasing layer side of the releasing film to a rubber surface and the dynamic friction coefficient ($\mu$dM) of the other releasing layer side of the releasing film to a metal surface satisfy the following formula (4):

$$-0.5 \leq (\mu dR - \mu dM) \leq 0.5 \tag{4}$$

(B) A releasing film comprising a base film produced from a polyethylene naphthalate and a releasing layer formed on one side of the base film, wherein the dynamic friction coefficient ($\mu$dR) of the releasing layer side of the releasing film to a rubber surface and the dynamic friction coefficient ($\mu$dM) of the other side of the releasing film to a metal surface satisfy the following formula (4):

$$-0.5 \leq (\mu dR - \mu dM) \leq 0.5 \tag{4}$$

In the releasing films (A) and (B), the base film may be a biaxially oriented film produced from a polyethylene naphthalate and its thickness is, as mentioned previously, preferably 5 to 500 μm, particularly preferably 10 to 200 μm.

In order for the releasing films (A) and (B) to have the above-mentioned dynamic friction coefficients to a rubber surface and a metal surface, it is desirable that their releasing layers are composed mainly of a resin composition comprising 1 to 50 parts by weight of a silicone resin on the basis of 100 parts by weight of a resin mixture consisting of a melamine resin and an alkyd resin and/or an acrylic resin.

The resin mixture preferably consists of 10 to 200 parts by weight of a melamine resin on the basis of 100 parts by weight of an alkyd resin and/or an acrylic resin.

The silicone resin, melamine resin, alkyd resin and acrylic resin constituting the above releasing layers can be the same as mentioned previously, and their proportions are preferred to be also the same as mentioned previously. The thickness of the releasing layers is preferably 0.02 to 50 μm as mentioned previously.

Effects of the Invention

According to the present invention, there can be provided a releasing film which is superior in thermal stability and surface smoothness, which is low in deformation caused by the heat during production of a resin sheet or the like thereon, and which can produce a sheet having good processability such as cuttability.

The releasing film of the present invention is useful as a protective film for an adhesive coating produced from an adhesive solution, or as a carrier film for a resin sheet, a resin coating, a ceramic sheet or the like, each produced from a resin solution, a slurry or the like; can allow coating thereon of even an adhesive solution, a resin solution or a slurry each of aqueous type; can be transferred smoothly in production thereon of an adhesive coating, a resin coating, a resin sheet or the like; and can be used advantageously in producing obtained various film or sheet having a smooth surface.

EXAMPLES

The present invention is described in more detail below by way of Examples. Each characteristic value was obtained by the following measurement methods.
(1) Glass transition temperature (Tg)

Glass transition peak temperature was measured using a differential thermal analyzer (DSC 2100, a product of Du Pont), at a temperature elevation rate of 20° C./min.

(2) Surface center line average roughness (Ra)

The surface of a film was scanned using a stylus type surface roughness tester (Surfcorder 30C, a product of Kosaka Kenkyusho K.K.) under the conditions of stylus radius =2 μm and stylus pressure =30 mg to measure the displacements of the film surface and prepare a surface roughness curve. The cut-off value was 80 μm. From the surface roughness curve, a length (L) measured in the direction of its center line was extracted, and when the surface roughness curve was expressed as (Y=f(x)) for which a scanning length was taken as X axis and the surface displacement was taken as Y axis, the surface center line average roughness (Ra) of the film was calculated using the following formula:

$$Ra = \frac{1}{L}\int_0^L |f(X)|\,dx$$

(3) Inherent viscosity of polymer

Measured at 35° C. in an o-chlorophenol solution of polymer (polymer concentration: % by weight).

(4) Thermal stability of base film

A PEN polymer was calculated for the heat deterioration index from the inherent viscosities of the polymer before and after production of base film, using the following formula to evaluate thermal stability.

Heat deterioration index=([η o]/[η x])−1 wherein [η o] is the inherent viscosity of the polymer before production of base film, and [η x] is the inherent viscosity of the polymer after production of base film.

Standard for Evaluating of Thermal Stability

○: Heat deterioration index ≦0.05

Δ: 0.05 <heat deterioration index ≦0.10

X: 0.10 <heat deterioration index (5) Surface smoothness of releasing film

A base film was coated, for formation of a releasing layer thereon, with an addition reaction type silicone, followed by heating at 140° C. for 1 min. The resulting releasing film was cut into a size of 10 cm×20 cm. The cut releasing film was placed on a flat floor in free length. The 10 cm×10 cm portion of the film was covered with a metal sheet and the film edge not covered was observed for rise. The surface smoothness of the releasing film was evaluated according to the following standard.

Standard for Evaluating

○: The rise (height) of the edge is less than 2 mm.

Δ: The rise (height) of the edge is 2 mm to less than 8 mm.

X: The rise (height) of the edge is 8 mm or more.

(6) Processability

A releasing film was coated with an aqueous solution of a polyvinyl alcohol resin as a model coating in an as-dried thickness of 30 μm, followed by drying to evaporate the water contained in the coated solution. Then, the resulting material was punched using a metal die of 15 cm×15 cm, and the punched material was observed for fin of edge, bending of corner, and occurrence of cracking. The processability of the releasing film was evaluated according to the following standard.

○: There is neither fin nor bending.

Δ: Very small fin or film bending appears, and resin film shows slight stretching. Or, very slight interlaminar delamination appears.

X: Releasing film shows interlaminar delamination, fin, or cracking; or, resin film does not cut well.

(7) Refractive index (nz) in thickness direction, and plane orientation coefficient (NS)

Refractive indices of base film in film-winding direction, direction perpendicular thereto and thickness direction were measured at 25° C. using Na D-line, using an Abbe's refractometer (a product of K.K. Atago). Plane orientation coefficient is represented by the following formula: Plane orientation coefficient (NS)=(nMD+nTD)/2−nz wherein nMD is the refractive index of base film in film-winding direction; nTD is the refractive index of the base film in direction perpendicular thereto; and nz is the refractive index of the base film in thickness direction.

(8) Tearing propagation resistance

An Elmendorf tear tester (a product of K.K. Toyoseiki Seisakusho) was used. A rectangular film sample of 52 mm (X) ×65 mm (Y) was collected; at the center of the X side, a crack of 13 mm in length in the Y direction was formed; and a force required for tearing the remaining 52 mm was measured. The force was divided by the thickness of film to take the quotient as the tearing propagation resistance of the film sample. This measurement was conducted in the film-winding direction (the film longitudinal direction) and a direction perpendicular thereto.

(9) Resistance to heat distortion

A rectangular releasing film cut out to length of 30 mm or more in measurement direction and to width of 4 mm was fitted to the jig of a TMA (TMA/SS120 C, a heat stress strain tester, a product of Seiko Instruments Inc.) so that the distance between chucks became 10 mm. While a stress of 150 gf/mm$^2$ was applied to the film, the film was heated from room temperature at a temperature elevation rate of 5° C./min. When the film temperature reached 120° C., the film was measured for dimensional changes in stress direction and direction perpendicular thereto. The dimensional change of the film was determined using the following formula. Dimensional change rate (absolute value)=|dimensional change/distance between chucks|×100

(10) Friction coefficient

A releasing film sample having a releasing layer on one side was placed on a rubber sheet or a metal sheet (a metal having a hard chromium-plated surface). The rubber sheet or the metal sheet was placed on a fixed glass plate to be pulled by a roll at a constant speed of 150 mm/min. A detector for pulling force was fixed to one end at the upper side of the releasing film (contrary end in the direction for pulling force at the lower side of the film) to detect a pulling force between the releasing film and the rubber sheet or the metal sheet. On the film was placed a load of 200 g having, at the lower side, a surface area of 10 cm×5 cm. Dynamic friction coefficient (μd) is a non-dimensional value obtained by dividing the puling force (unit: g) after the rubber sheet or the metal sheet has begun to move, by 200 g (the weight of the load). The dynamic friction coefficient between the releasing layer of the releasing film and the rubber sheet is expressed as μdR, and the dynamic friction coefficient between the releasing layer of the releasing film and the metal sheet is expressed as μdM.

As the metal sheet was used a ferro sheet S-grade having a surface roughness of 11 nm. As the rubber sheet was used a neoprene rubber having a surface roughness of 740 nm.

(11) Wettability of aqueous coating fluid

The following components were mixed in a ball mill and dispersed so as to obtain a grade of 7 or more as measured using a Hegmann grinding gauge.

| Composition of ceramic powder-dispersed slurry | | |
|---|---|---|
| a. | Ceramic powder (barium titanate) | 100 parts by weight |
| b. | Water-soluble acrylic emulsion | 9–13 parts by weight |
| c. | Water-soluble polyurethane resin | 1 part by weight |
| d. | Ammonium polycarboxylate | 1 part by weight |
| e. | Water | 10–20 parts by weight |
| f. | Ammonia | 1 part by weight |

The ceramic powder-dispersed slurry obtained was coated on the releasing layer side of a releasing film using an straight-edge applicator having gaps of 1 mil, followed by drying at 110° C. for 2 minutes; then, the state of cissing at the edge portions of the film was observed. The wettability of the aqueous coating fluid was evaluated according to the following standard.

A: No cissing is observed (good wettability).
B: Slight cissing is observed (moderately good wettability)
C: Cissing is observed (bad wettability).

(12) Releasability of ceramic sheet

The ceramic sheet formed on a releasing film in the same manner as in the above item (11) was released from the releasing film, and the condition of release was observed. The releasability of the ceramic sheet was evaluated according to the following standard.

A: Easily peelable (good peelability).
B: The releasing strength is large, and rapid pulling gives rise to rupture of ceramic sheet (moderately good peelability).
C: The peeling strength is too large, and peeling gives rupture of ceramic sheet.
D: The ceramic sheet has an inferior surface owing to the rough surface of the releasing film and ruptures (inferior sheet surface).
E: Sheeting is impossible owing to cissing.

(13) Residual adhesivity percentage

A polyester adhesive tape (Nitto 31B) was stuck on a cold rolled stainless steel plate (SUS 304) specified by JIS G 4305 and measured for peeling strength. This peeling strength was taken as base adhesivity ($f_o$). The polyester adhesive tape separately laminated on the releasing layer of a releasing film was subjected to contact-bonding by the use of a pressure roll of 2 kg and allowed to stand for 30 minutes; then, the adhesive tape was peeled. This peeled adhesive tape was stuck on the above stainless steel plate and measured for peeling strength. This peeling strength was taken as residual adhesivity (f). A residual adhesivity percentage was determined from the base adhesivity ($f_o$) and the residual adhesivity (f), using the following formula.
Residual adhesivity percentage (%)=(f/$f_o$)×100

Incidentally, the preferred range of the residual adhesivity percentage of releasing film is 85% or above. A residual adhesivity percentage of below 85% is not preferred because, when, for example, the releasing film is stored in a rolled state, the component constituting the releasing layer is transferred on the adjacent surface of the film (back transferring) in some cases, thereby making inferior the wettability, peelability and the like of the releasing layer.

EXAMPLE 1

To 100 parts by weight of dimethyl 2,6-naphthalenedicarboxylate and 60 parts by weight of ethylene glycol was added manganese acetate tetrahydrate as an ester interchange catalyst in an amount shown in Table 1, to conduct ester interchange. Thereto was added trimethyl phosphate in an amount shown in Table 1, to complete the ester interchange. Further, antimony trioxide was added in an amount shown in Table 1, after which polycondensation was conducted at a high temperature under high vacuum to obtain a PEN polymer having an inherent viscosity of 0.62. The PEN polymer contained 1.0% by weight of diethylene glycol (DEG) units.

To the PEN polymer were added 0.15% by weight of truly spherical silica particles having an average particle diameter of 0.3 μm, and they were melted in an extruder. The molten polymer was extruded from the die of the extruder onto a rotary cooling drum kept at 40° C., and was electrostatically adhered thereto and rapidly cooled to obtain an unstretched film. The unstretched film was stretched 3.6 times in the longitudinal direction and subsequently 3.6 times in the transverse direction, and thermoset at 230° C. to obtain a biaxially oriented PEN film having a thickness of 50 μm.

On one side of the biaxially oriented PEN film was coated a coating fluid prepared as mentioned below, in an amount of 6 g/m² (wet), and the coated fluid was heat-dried and cured at 140° C. for 1 minute to produce a releasing film having a releasing layer of 0.1 μm in thickness. The properties of the releasing film are shown in Table 1.

The coating solution was prepared by dissolving a curing silicone of addition-reaction type comprising a vinyl group-containing polydimethylsiloxane and dimethylhydrogensilane, in a mixed solvent of methyl ethyl ketone, methyl isobutyl ketone and toluene, adding a silicone resin thereto so as to become an amount of 10% by weight based on the solid content of the curing silicone to obtain a solution having the total solid content of 2%, and adding a platinum catalyst to the resulting solution.

EXAMPLE 2

Comparative Examples 1 to 2

Releasing films were produced in the same manner as in Example 1 except that the addition amounts of manganese acetate, trimethyl phosphate and antimony trioxide were changed as shown in Table 1 and the content of truly spherical silica particles was changed to 0.40% by weight. The properties of the films are shown in Table 1.

TABLE 1

| | | Example 1 | Example 2 | Comparative Example 1 | Comparative Example 2 |
|---|---|---|---|---|---|
| Catalyst amount | Mn (moles) | 1.20 | 1.57 | 1.86 | 1.44 |
| | P (moles) | 1.60 | 2.09 | 2.48 | 3.00 |
| | Sb (moles) | 0.84 | 0.84 | 1.24 | 2.40 |
| Catalyst ratio (Mn/P) | | 0.75 | 0.75 | 0.75 | 0.48 |
| Glass transition temperature (Tg) (° C.) | | 120 | 121 | 121 | 120 |

TABLE 1-continued

|  | Example 1 | Example 2 | Comparative Example 1 | Comparative Example 2 |
|---|---|---|---|---|
| Surface center line average roughness (nm) | 12 | 28 | 36 | 52 |
| Thermal stability of base film | ◯ | ◯ | Δ | X |
| Surface smoothness of releasing film | ◯ | ◯ | Δ | X |
| Processability | ◯ | ◯ | Δ | Δ |

As is clear from Table 1, the releasing films of the present invention shown in Examples were superior in thermal stability of base film, were superior in dimensional stability and surface smoothness after heat treatment in formation of releasing layer, and were good in processability. The releasing films of Comparative Examples 1 and 2 were inferior in thermal stability of the film after forming and consequently in flatness and transparency, were inferior in surface smoothness of releasing film obtained, were large in thickness non-uniformity of resin solution coated thereon, caused interlaminar delamination during cutting, and were insufficient.

EXAMPLES 3 and 4

Comparative Examples 3 and 4

A PEN polymer having an inherent viscosity shown in Table 2, containing 0.15% by weight of truly spherical silica particles having an average particle diameter of 0.3 μm was melted in an extruder. The molten polymer was extruded from the die of the extruder onto a rotary cooling drum kept at 40° C., and was electrostatically adhered thereto and rapidly cooled to obtain an unstretched film. The unstretched film was subjected to successive biaxial stretching first in the longitudinal (machine axial) direction and then in the transverse (width) direction, under the conditions shown in Table 2. The stretched film was thermoset under the temperature condition shown in Table 2, to obtain a biaxially oriented PEN film having a thickness of 50 μm. The Mn, P and Sb contents in the PEN polymer were about the same as in Example 1.

On one side of the biaxially oriented PEN film was coated a coating fluid prepared as mentioned below, in an amount of 6 g/m² (wet), and the coated fluid was heat-dried and cured at 140° C. for 1 minute to produce various releasing films each having a releasing layer of 0.1 μm in thickness. The properties of the releasing films are shown in Table 2.

The coating solution was prepared by dissolving a curing silicone of addition-reaction type comprising a vinyl group-containing polydimethylsiloxane and dimethylhydrogensilane, in a mixed solvent of methyl ethyl ketone, methyl isobutyl ketone and toluene, adding a silicone resin thereto so as to become an amount of 10% by weight based on the solid content of the curing silicone to obtain a solution having the total solid content of 2%, and adding a platinum catalyst to the resulting solution.

TABLE 2

|  |  | Example 3 | Example 4 | Comparative Example 3 | Comparative Example 4 |
|---|---|---|---|---|---|
| Inherent viscosity of polymer (dl/g) | | 0.62 | 0.60 | 0.62 | 0.66 |
| Draw ratio | Longitudinal direction (times) | 3.5 | 3.6 | 2.8 | 4.3 |
|  | Transverse direction (times) | 3.6 | 3.7 | 3.0 | 4.4 |
| Thermosetting temperature (° C.) | | 260 | 250 | 250 | 200 |
| Refractive index (nz) in thickness direction | | 1.51 | 1.495 | 1.535 | 1.485 |
| Plane orientation coefficient (NS) | | 0.24 | 0.26 | 0.225 | 0.275 |
| Resistance to | Longitudinal direction (%) | 0.1 | 0.05 | 0.25 | 0.05 |
| heat distortion | Transverse direction (%) | 0.15 | 0.1 | 0.35 | 0.05 |
| Tearing propagation resistance (N/mm) (longitudinal direction + transverse direction) | | 2.5 | 3.0 | 4.5 | 1.8 |
| Processability | | ◯ | ◯ | Δ | X |

As is clear from Table 2, the releasing films of the present invention shown in Examples were superior in thermal stability of base film, were superior in dimensional stability and surface smoothness after heat treatment in formation of releasing layer, and were good in processability. The releasing films of Comparative Examples 3 and 4 were inferior in thermal stability of the film after forming and consequently in flatness, were inferior in surface smoothness of releasing film obtained, were large in thickness non-uniformity of resin solution coated thereon, caused interlaminar delamination during cutting, and were insufficient.

EXAMPLE 5

A polyethylene-2,6-naphthalenedicarboxylate (hereinafter abbreviated to PEN in some cases) having an inherent viscosity of 0.60, containing 0.25% by weight of truly spherical silica particles having an average particle diameter of 0.3 μm was melted in an extruder. The molten polymer was extruded from the die of the extruder onto a rotary cooling drum kept at 400° C., and was electrostatically adhered thereto and rapidly cooled to obtain an unstretched film. The unstretched film was stretched 3.7 times in the longitudinal direction and successively 3.7 times in the transverse direction, and thermoset at 230° C. The biaxially oriented PEN film obtained was subjected to a relaxation treatment at 120° C. for 1 minute under a tension of 8 kgf/cm², to obtain a biaxially oriented PEN film having a thickness of 50 μm.

Next, there were mixed 100 parts by weight of an alkyd resin (a linseed oil-modified alkyd resin), 100 parts by weight of an acrylic resin (a polyethyl acrylate), 100 parts by weight of a melamine resin (a butylated melamine resin) and 75 parts by weight of a silicone resin (a hydroxyl-substituted diphenyl polysiloxane) (25 parts by weight of the silicone resin corresponded to 100 parts by weight of a resin mixture consisting of the alkyd resin, the acrylic resin and the melamine resin). The resulting resin composition was dissolved in a mixed solvent consisting of methyl ethyl ketone, methyl isobutyl ketone and toluene, to prepare a solution having a total solid content of 3% by weight. To the solution was added an acid catalyst (p-toluenesulfonic acid) as an accelerator for curing reaction, whereby a coating fluid was prepared.

The coating fluid was coated on one side of the previously-obtained PEN film in an amount of 8 g/m² (wet), followed by heat-drying at 150° C. for 1 minute to cure the coating film, to obtain a releasing film having a releasing layer of 0.3 μm in thickness. The properties of the releasing film are shown in Table 3.

Comparative Example 5

A PET polymer having an inherent viscosity of 0.62, containing 0.1% by weight of truly spherical silica particles having an average particle diameter of 0.12 μm was melted in an extruder. The molten polymer was extruded from the die of the extruder onto a rotary cooling drum kept at 40° C., and was electrostatically adhered thereto and rapidly cooled to obtain an unstretched film. Then, the unstretched film was stretched 3.6 times in the longitudinal direction and successively 3.9 times in the transverse direction, and thermoset at 220° C. The biaxially oriented PET film obtained was subjected to a relaxation treatment at 120° C. for 1 minute under a tension of 8 kgf/cm², to obtain a biaxially oriented PET film having a thickness of 50 μm.

There was prepared, as a coating fluid, a solution having a total solid content of 5% by weight, by dissolving a curing silicone of addition reaction type (KS 847(H), a product of Shin-Etsu Chemical Co., Ltd.) obtained by adding a platinum catalyst to a mixed solution of a polydimethylsiloxane and dimethylhydrogensilane, in a mixed solvent consisting of methyl ethyl ketone, methyl isobutyl ketone and toluene. This solution was coated on one side of the above-prepared biaxially oriented PET film after relaxation treatment, in an amount of 10 g/m² (wet), followed by heat-drying at 150° C. for 1 minute to cure the coating film, to produce a releasing film having a releasing layer of 0.6 μm in thickness. The properties of the releasing film are shown in Table 3.

Comparative Example 6

A PET polymer having an inherent viscosity of 0.62, containing 0.5% by weight of truly spherical silica particles having an average particle diameter of 0.4 μm was melted in an extruder. The molten polymer was extruded from the die of the extruder onto a rotary cooling drum kept at 40° C., and was electrostatically adhered thereto and rapidly cooled to obtain an unstretched film. Then, the unstretched film was stretched 3.6 times in the longitudinal direction and successively 3.9 times in the transverse direction, and thermoset at 220° C. The biaxially oriented PET film obtained was subjected to a relaxation treatment at 120° C. for 1 minute under a tension of 8 kgf/cm², to obtain a biaxially oriented PET film having a thickness of 50 μm.

A solution having a total solid content of 3% by weight was prepared by dissolving a resin composition consisting of 100 parts by weight of an alkyd resin (a coconut oil-modified alkyd resin) and 40 parts by weight of a melamine resin (a butylated melamine resin), in a mixed solvent consisting of methyl ethyl ketone, methyl isobutyl ketone and toluene.

This solution was coated on one side of the above-prepared biaxially oriented PET film in an amount of 8 g/m² (wet), followed by heat-drying at 150° C. for 1 minute to cure the coating film, to produce a releasing film having a releasing layer of 0.3 μm in thickness. The properties of the releasing film are shown in Table 3.

TABLE 3

| | Slipperiness (dynamic friction coefficient) | | | Properties of releasing layer | | | |
| --- | --- | --- | --- | --- | --- | --- | --- |
| | μdR | μdM | (μdR − μdM) | Ra (nm) | Wettability | Releasability | Residual adhesivity (%) |
| Example 5 | 0.35 | 0.25 | +0.10 | 7 | A | A | 93 |
| Comparative Example 5 | 4.00 | 0.10 | +3.90 | 9 | C | D | 86 |
| Comparative Example 6 | 0.40 | 0.10 | +0.30 | 40 | A | C | 94 |

As is clear from Table 3, the releasing film of the present invention shown in Example 5 has good slipperiness, has good surface wettability although small in surface roughness, that is, is superior in cissing against coating fluid or the like as well as in sheet releasability, and enables formation thereon of a thin resin coating of smooth surface.

What is claimed is:

1. A releasing film comprising:
   a base film produced from a polyethylene naphthalate, and
   a releasing layer formed on one or both sides of the base film, wherein the polyethylene naphthalate contains naphthalenedicarboxylic acid as the main acid component and ethylene glycol as the main glycol component and further contains a manganese compound, a phosphorus compound and an antimony compound in Mn, P and Sb amounts satisfying all of the following formulas (1) to (3):

$$0.7 \leq Mn \leq 1.6 \tag{1}$$
$$0.5 \leq Mn/P \leq 1.2 \tag{2}$$
$$0.7 \leq Sb \leq 2.2 \tag{3}$$

(wherein Mn is moles of manganese element per $10^6$ g of acid component; P is moles of phosphorus element per $10^6$ g of acid component; and Sb is moles of antimony element per $10^6$ g of acid component), and the base film has a surface center line average roughness (Ra) of 2 to 50 nm.

2. A releasing film according to claim 1, wherein the polyethylene naphthalate contains a manganese compound, a phosphorus compound and an antimony compound in Mn, P and Sb amounts satisfying all of the following formulas (1') to (3'):

$$1.0 \leq Mn \leq 1.5 \quad (1')$$

$$0.6 \leq Mn/P \leq 1.1 \quad (2')$$

$$0.7 \leq Sb \leq 2.0 \quad (3')$$

(wherein Mn is moles of manganese element per $10^6$ g of acid component; P is moles of phosphorus element per $10^6$ g of acid component; and Sb is moles of antimony element per $10^6$ g of acid component).

3. A releasing film according to claim 1, wherein the releasing layer has a surface center line average roughness (Ra) of 6 to 30 nm.

4. A releasing film according to claim 1, which has (a) a refractive index (nz) in thickness direction, of 1.49 to 1.53 and (b) a plane orientation coefficient (NS) of 0.23 to 0.27.

5. A releasing film according to claim 1, wherein the base film has (c) a sum of the tearing propagation resistance in longitudinal direction and the tearing propagation resistance in direction perpendicular thereto, of 4 N/mm or less.

6. A releasing film according to claim 1, wherein the base film has (d) a dimensional change at 120° C. under a stress of 150 gf/mm², of 0.3% or less in any of the longitudinal direction and the direction perpendicular thereto.

7. A releasing film according to claim 1, wherein the base film has a thickness of 5 to 500 μm.

8. A releasing film according to claim 1, wherein the polyethylene naphthalate has an inherent viscosity of 0.40 to 0.90 dl/g.

9. A releasing film according to claim 1, wherein the polyethylene naphthalate contains ethylene-2,6-naphthalate units in an amount of at least 80 mole % based on the total repeating units.

10. A releasing film according to claim 1, wherein the polyethylene naphthalate contains diethylene glycol units in an amount of 0.4 to 3% by weight.

11. A releasing film according to claim 1, wherein the releasing layer made of at least one kind selected from a silicone resin, a fluororesin and an aliphatic wax is formed on one or both sides of the base film.

12. A releasing film according to claim 1, wherein the releasing layer is formed on both sides of the base film and the dynamic friction coefficient ($\mu$dR) of one releasing layer side of the releasing film to a rubber surface and the dynamic friction coefficient ($\mu$dM) of the other releasing layer side of the releasing film to a metal surface satisfy the following formula (4):

$$-0.5 \leq (\mu dR - \mu dM) \leq 0.5 \quad (4).$$

13. A releasing film according to claim 1, wherein the releasing layer is formed on one side of the base film and the dynamic friction coefficient ($\mu$dR) of the releasing layer side of the releasing film to a rubber surface and the dynamic friction coefficient ($\mu$dM) of the other side of the releasing film to a metal surface satisfy the following formula (4):

$$-0.5 \leq (\mu dR - \mu dM) \leq 0.5 \quad (4).$$

14. A release film according to claim 1, wherein the releasing layer is composed mainly of a resin composition comprising 1 to 50 parts by weight of a silicone resin on the basis of 100 parts by weight of a resin mixture consisting of a melamine resin and an alkyd resin and/or an acrylic resin.

15. A releasing film according to claim 14, wherein the resin mixture consists of 10 to 200 parts by weight of a melamine resin on the basis of 100 parts by weight of an alkyd resin and/or an acrylic resin.

16. A releasing film comprising:

a base film produced from a polyethylene naphthalate, and a releasing layer formed on both sides of the base film, wherein the dynamic friction coefficient ($\mu$dR) of one releasing layer side of the releasing film to a rubber surface and the dynamic friction coefficient ($\mu$dM) of the other releasing layer side of the releasing film to a metal surface satisfy the following formula (4):

$$-0.5 \leq (\mu dR - \mu dM) \leq 0.5 \quad (4).$$

17. A releasing film comprising:

a base film produced from a polyethylene naphthalate, and a releasing layer formed on one side of the base film, wherein and the dynamic friction coefficient ($\mu$dR) of the releasing layer side of the releasing film to a rubber surface and the dynamic friction coefficient ($\mu$dM) of the other side of the releasing film to a metal surface satisfy the following formula (4):

$$-0.5 \leq (\mu dR - \mu dM) \leq 0.5 \quad (4).$$

18. A releasing film according to claim 16 or 17, wherein the releasing layer is composed mainly of a resin composition comprising 1 to 50 parts by weight of a silicone resin on the basis of 100 parts by weight of a resin mixture consisting of a melamine resin and an alkyd resin and/or an acrylic resin.

19. A releasing film according to claim 18, wherein the resin mixture consists of 10 to 200 parts by weight of a melamine resin on the basis of 100 parts by weight of an alkyd resin and/or an acrylic resin.

* * * * *